United States Patent [19]

Geck

[11] 4,376,191
[45] Mar. 8, 1983

[54] USE OF DIALKYLZINC COMPOUNDS TO INITIATE POLYMERIZATION OF ETHYLENE WITH CHROMIUM OXIDE CATALYSTS

[75] Inventor: Reginald W. Geck, Victoria, Tex.

[73] Assignee: Union Carbide Corporation, Danbury, Conn.

[21] Appl. No.: 307,580

[22] Filed: Oct. 1, 1981

[51] Int. Cl.$^3$ .............................................. C08F 4/78
[52] U.S. Cl. .................................... 526/102; 252/430; 526/348.6
[58] Field of Search ........................................ 526/102

[56]     References Cited
U.S. PATENT DOCUMENTS

| | | | |
|---|---|---|---|
| 2,825,721 | 3/1958 | Hogan et al. | 526/102 |
| 3,023,203 | 2/1962 | Dye | 260/94.9 |
| 3,298,792 | 1/1967 | Di Drusco | 23/284 |
| 3,622,521 | 11/1971 | Hogan et al. | 526/96 |
| 3,984,351 | 10/1976 | Rekers et al. | 526/102 |
| 4,011,382 | 3/1977 | Levine et al. | 526/96 |

FOREIGN PATENT DOCUMENTS 976314  11/1964  United Kingdom .

*Primary Examiner*—Stanford M. Levin
*Attorney, Agent, or Firm*—John S. Piscitello

[57]      ABSTRACT

A method for initiating polymerization of ethylene in a fluidized bed reactor employing a supported chromium oxide as catalyst in a smooth and controlled manner, and for reducing the start-up time required to initiate such polymerization, by adding a dialkylzinc compound to the reactor prior to the commencement of polymerization and subjecting the reactor containing such dialkylzinc compound to conditions conventionally employed in the polymerization of ethylene with such catalyst.

28 Claims, 1 Drawing Figure

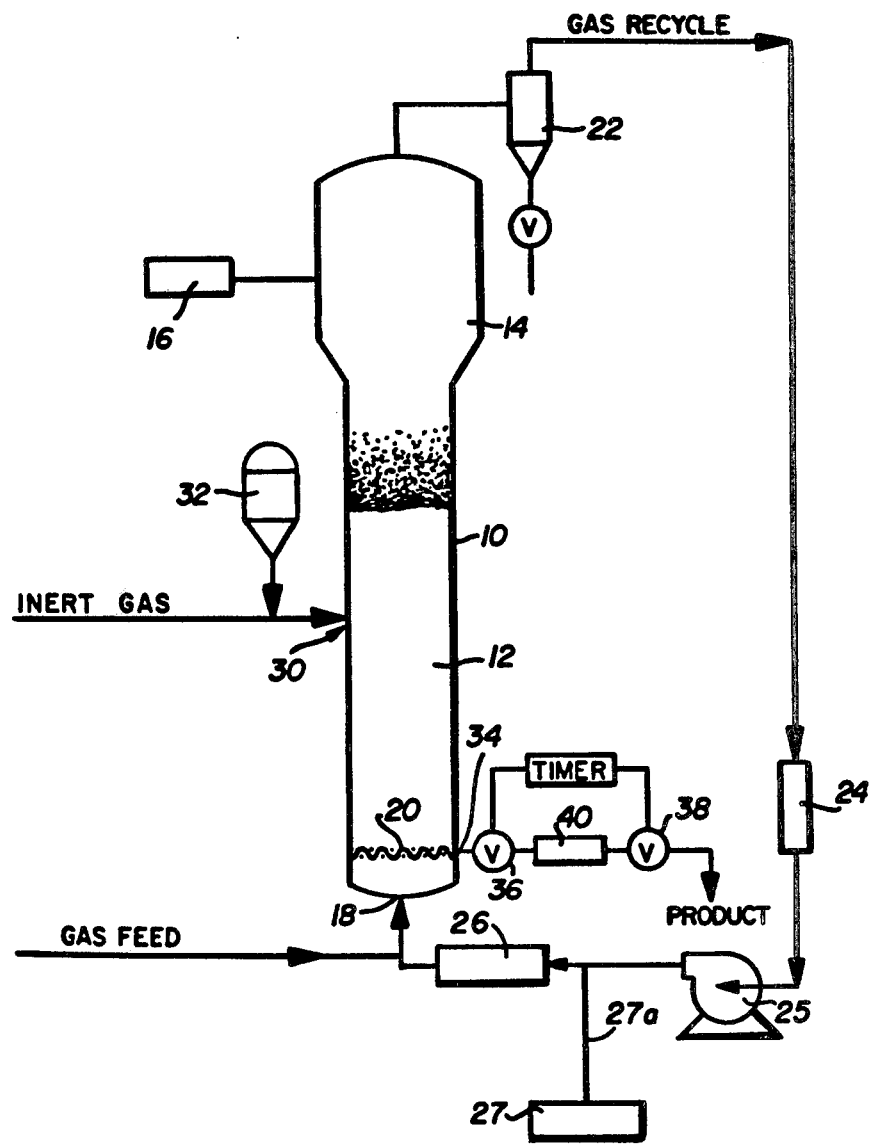

USE OF DIALKYLZINC COMPOUNDS TO INITIATE POLYMERIZATION OF ETHYLENE WITH CHROMIUM OXIDE CATALYSTS

FIELD OF THE INVENTION

This invention relates to a method for initiating polymerization of ethylene in a fluidized bed reactor employing a supported chromium oxide as catalyst in a smooth and controlled manner, and for reducing the start-up time required to initiate such polymerization.

BACKGROUND OF THE INVENTION

From time to time during the commercial production of ethylene homopolymers and copolymers in a fluidized bed reactor, it is necessary to shut down the polymerization reactor for periodic maintainance and cleaning. In order to re-initiate polymerization following such shutdowns when supported chromium oxide is intended to be used as catalyst in the process, it is necessary to introduce a quantity of such catalyst into the reactor that is many times that required to carry on reaction at a normal rate. However, because such catalyst normally exhibits long induction times, polymerization usually cannot be initiated for at least 4 to 12 hours following introduction of the catalyst into the reactor. Further, once polymerization commences, it ordinarily proceeds very rapidly due to the large amount of catalyst present. Indeed, so rapid is the polymerization (and heat generation) that it presents the possibility of a runaway reaction which results in fouling of the reactor due to fusing of the rapidly-forming polymer and/or sheeting of the polymer on the reactor wall where mixing and heat removal are not as effective as in the center of the bed.

One procedure suggested to reduce the time required to initiate polymerization of ethylene with a supported chromium oxide catalyst, and to reduce the possibility of a runaway reaction, is to commence polymerization with a supported silyl chromate catalyst and then switch to the supported chromium oxide catalyst after polymerization has begun. However, this procedure suffers from the disadvantage that the properties of the initial polymerization product differ from the desired polymer properties, and hence a great deal of waste product must be produced before the desired product can be obtained. As a result, polymerization must be continued for a time sufficient to provide at least 4 to 6 bed turnovers before the desired product can be obtained (i.e., at least the equivalent of 4 to 6 beds of polymer must be removed from the reactor following the initiation of polymerization before polymers having the desired properties can be obtained).

SUMMARY OF THE INVENTION

In accordance with the present invention it has now been found that polymerization of ethylene in a fluidized bed reactor employing a supported chromium oxide as catalyst can be initiated smoothly and controllably, and in substantially shorter periods of time than hetertofore required, with minimal deterioration of resin properties, by adding a dialkylzinc compound to the reactor prior to the commencement of polymerization and subjecting the reactor containing such dialkylzinc compound to conditions conventionally employed in the polymerization of ethylene with such catalyst.

BRIEF DESCRIPTION OF THE DRAWING

The drawing shows a fluid bed reactor system which can be used to polymerize ethylene.

DESCRIPTION OF THE PREFERRED EMBODIMENTS

When start-up of the reactor is initiated in accordance with the present invention, it has been found that polymerization commences in a relatively short period of time and the reaction rate increases in a smooth and controllable manner to the normal level without reactor hot-spotting or fouling. Generally, no more than 3 hours, and usually no more than 2 hours, are required before polymerization commences as compared to at least 4 hours which are normally required to initiate polymerization when employing a supported chromium oxide catalyst. As a result, polymerization can usually be initiated in less than one-half the time formerly required to initiate polymerization with a supported chromium oxide catalyst.

Furthermore, it has been found that unusually large amounts of catalysts are not required to initiate polymerization according to the present invention, and that polymerization can be initiated in the presence of only the usual amount of catalyst required for continuous polymerization. Following the commencement of polymerization, polymers having desired properties are obtained after no more than three bed turnovers.

The dialkylzinc compounds employed in the process of the present invention can be illustrated by the formula:

$$ZnR_aR_b$$

wherein $R_a$ and $R_b$ are alkyl radicals, which radicals may be the same or different. Generally $R_a$ and $R_b$ are alkyl radicals containing from 1 to 12 carbon atoms, usually from 1 to 6 carbon atoms. Such radicals may be cyclic, branched or straight chain, and may be substituted with any substituent which is nonreactive with the catalyst and reactants present in the reactor. Illustrative of such radicals are methyl, ethyl, n-propyl, isopropyl, n-butyl, tert-butyl, n-hexyl, n-octyl, n-decyl, and the like.

The dialkylzinc compound employed in the process of the present invention should be added to the fluidized bed reactor in an amount sufficient to provide from 1 mol to 5,000 mols of zinc per mol of chromium normally present during polymerization, preferably from 500 to 3,500 mols of zinc per mol of chromium normally present during polymerization. Such dialkylzinc compund is usually added to the reactor dissolved in an inert liquid solvent. By an inert liquid solvent is meant a solvent which is nonreactive with the dialkylzinc compound as well as the catayst and reactants present in the reactor during polymerization. Hydrocarbons such as isopentane, hexane, heptane, toluene, xylene and naphtha are preferred for this purpose. Generally, such solutions contain from 1 weight percent to 99 weight percent of the dialkylzinc compound, usually from 2 weight percent to 12 weight percent of such compound.

As is conventional in the art, prior to initiating polymerization, the polymerization reaction system is first purged under pressure with an inert gas in order to remove any volatile catalytic poisons, such as oxygen and moisture, which may be present in the system. By an inert gas is meant a gas which is nonreactive with the dialkylzinc compund and the catalyst and reactants present in the reactor during polymerization. Among such gases are nitrogen, argon, xenon, helium and the like. Typically purging is effected by passing such inert gas through the reaction system under a pressure of from 1 psi to 300 psi, preferably under a pressure of from 5 psi to 50 psi. For greater effectiveness the gas is heated at a temperature of from 20° C. to 150° C., preferably from 60° C. to 100° C.

Preferably, purging is continued until no more than 5 ppm. of moisture is present in the reaction system, and preferably until no more than 3 ppm. is present. Generally, purging for from 1 hour to 6 hours is required to reduce the moisture content of the reaction system to below 5 ppm. Somewhat longer times, generally from 2 hours to 8 hours, are required to reduce the moisture content of the reaction system to below 3 ppm.

After the reaction system has been purged with an inert gas, a bed of particulate polymer particles is introduced into the reactor and a second inert gas purge is employed to remove catalytic poisons from the bed and reaction system. Such purging is conventional in the art, and like the first purge, is employed to effect the removal of catalytic poisons. The same inert gases, pressures and temperatures employed in the first purge may be employed in the second purge, except that the temperature employed should not be permitted to exceed the sintering temperature of the polymer particles of the bed. As before, purging is preferably continued until no more than 5 ppm. of moisture is present in the reaction system, and most preferably until no more than 3 ppm. is present. Generally, purging for from 1 hour to 36 hours is required to reduce the moisture content of the reaction system to below 5 ppm., while purging for from 2 hours to 48 hours is required to reduce the moisture content to below 3 ppm.

After the reactor has been purged with an inert gas, the temperature and pressure in the reactor are adjusted to the temperature and pressure to be employed during polymerization, and the dialkylzinc compound is introduced into the reactor. Usually the reactor is pressurized to a pressure of from about 50 psi to about 350 psi, preferably from about 250 psi to about 350 psi, with ethylene, to which may be added any other alpha-olefin to be employed in the polymerization. Temperatures of from about 75° C. to about 115° C., preferably from about 80° C. to about 110° C., are usually employed. As stated above, the dialkylzinc compound is added in an amount sufficient to provide from 1 mol to 5,000 mols of zinc per mol of chromium normally present during polymerization. Such dialkylzinc compound can be added to the reactor before, after, or at the same time as the reactor is adjusted to polymerization conditions.

Although it is desirable to maintain the reactor under polymerization conditions in the presence of the dialkylzinc compound for at least 1 hour before adding the supported chromium oxide catalyst to the reactor, such conditions can be maintained for as little as 5 minutes. Preferably, such conditions are maintained for from 1 hour to 3 hours.

Following this treatment, the supported chromium oxide catalyst is introduced into the reactor at a rate of from about 25 percent to about 100 percent of the rate normally employed during polymerization, preferably at a rate of from about 30 percent to about 100 percent of the rate normally employed during polymerization, while polymerization conditions are maintained in the reactor.

Often polymerization will begin within one hour after the supported chromium oxide catalyst is introduced into the reactor. If polymerization does not begin within this time, or other desired time, further dialkylzinc compound may be introduced into the reactor in an amount sufficient to provide from 1 to 3,000 mols of zinc per mol of chromium being introduced into the reactor, preferably from 100 to 900 mols of zinc per mol of chromium being introduced into the reactor.

After polymerization has begun, it is necessary to maintain a catalytically effective amount of catalyst in the reactor to maintain reaction. During polymerization, the reactor should be maintained free of catalytic poisons such as moisture, oxygen, carbon monoxide and acetylene.

Supported chromium oxide catalysts are ordinarily employed to homopolymerize ethylene or copolymerize ethylene with at least one other alpha-olefin containing from 3 to 8 carbon atoms. Among such other alpha-olefins are propylene, butene-1, pentene-1, hexene-1 and octene-1. Preferably, such alpha-olefins are employed in an amount sufficient to achieve a concentration of from 1.0 to 15 mol percent in the copolymer.

The supported chromium oxide catalysts suitable for use in polymerizing alpha-olefins in a fluid bed reactor are described in U.S. Pat. Nos. 2,825,721 and 3,023,203. The supported titanated chromium oxide catalysts disclosed in U.S. Pat. No. 3,622,521 can also be employed, as well as the supported fluorided and titanated chromium oxide catalysts disclosed in U.S. Pat. No. 4,011,382.

Such supported chromium oxide catalysts can be prepared by depositing a suitable chromium compound, preferably along with a titanium compound, or most preferably both a titanium compound and a fluorine compound, on a dried support, and then activating the resulting composite composition by heating it in air or oxygen at a temperature of from about 300° C. to about 900° C., preferably from about 700° C. to about 850° C., for at least two hours, preferably from about 5 hours to about 15 hours. The chromium compound, titanium compound and fluorine compound are deposited on the support in such quantities as to provide, after the activation step, the desired levels of chromium, titanium and fluorine in the catalyst. After the compounds are placed on the support and it is activated, there results a powdery, free-flowing particulate material. About 0.005 weight percent to about 0.2 weight percent of the composite catalyst is normally employed per pound of polymer produced.

The order of addition of the chromium compound, titanium compund and fluorine compound to the support is not critical, provided that all these compounds are added before the composite catalyst is activated, and the support is dried before the titanium compound is added thereto.

After activation, the supported catalyst should contain, based on the combined weight of the support and the chromium, titanium and fluorine materials present therein, about 0.005 to about 3.0, and preferably about 0.1 to about 1.0, weight percent of chromium (calculated as Cr), $\geq 0$ to about 9.0, and preferably about 3.0 to about 7.0, weight percent of titanium (calculated as Ti), and $\geq 0.0$ to about 2.5, and preferably about 0.1 to about 1.0, weight percent of fluorine (calculated as F).

The chromium compounds which may be used include CrO₃, or any compound of chromium which is ignitable to CrO₃ under the activation conditions employed. Chromium compounds other than CrO₃ which may be used are disclosed in U.S. Pat. Nos. 2,825,721 and 3,622,521 (the disclosures of which patents are hereby incorporated by reference) and include chromic acetyl acetonate, chromic nitrate, chromic acetate, chromic chloride, chromic sulfate, and ammonium chromate.

Water soluble compounds of chromium, such as CrO₃, are the preferred compounds for use in depositing the chromium compound on the support from a solution of the compound. Organic solvent soluble chromium compounds may also be used.

The titanium compounds which may be used include all those which are ignitable to TiO₂ under the activation conditions employed, especially those disclosed in U.S. Pat. Nos. 3,622,521 and 4,011,382 (the disclosures of which patents are hereby incorporated by reference). These compounds include those having the structures $(R')_n Ti(OR')_m$ $(RO)_m Ti(OR')_n$ and $TiX_4$ where m is 1, 2, 3 or 4; n is 0, 1, 2 or 3; and m+n=4;
R is a $C_1$ to $C_{12}$ alkyl, aryl or cycloalkyl group, and combinations thereof, such as aralkyl, alkaryl, and the like;

R' is R, cyclopentadienyl, and $C_2$ to $C_{12}$ alkenyl groups, such as ethenyl, propenyl, isopropenyl, butenyl and the like; and X is chlorine, bromine, fluorine or iodine.

The titanium compounds would thus include titanium tetrachloride, titanium tetraisopropoxide and titanium tetrabutoxide. The titanium compounds are conveniently deposited on the support from a hydrocarbon solvent solution thereof.

The titanium (as Ti) is present in the catalyst, with respect to the Cr (as Cr), in a mol ratio of about 0 to 180, and preferably of about 4 to 35.

The fluorine compounds which may be used include HF, or any compound of fluorine which will yield HF under the activation conditions employed. Fluorine compounds other than HF which may be used are disclosed in U.S. Pat. No. 4,011,382. These compounds include ammonium hexafluorosilicate, ammonium tetrafluoroborate, and ammonium hexafluorotitanate. The fluorine compounds are conveniently deposited on the support from an aqueous solution thereof, or by dry blending the solid fluorine compounds with the other components of the catalyst prior to activation.

The support employed for the catalysts are porous, inorganic oxide materials having a high surface area, that is, a surface area in the range of about 50 to about 1000 square meters per gram, and a particle size of about 50 to 200 microns. The inorganic oxides which may be used include silica, alumina, thoria, zirconia and other comparable inorganic oxides, as well as mixtures of such oxides.

The catalyst support, which may have the chromium and/or fluorine compound deposited thereon, should be dried before it is brought into contact with the titanium compound. This is normally done by simply heating or pre-drying the catalyst support with a dry inert gas or dry air prior to use. It has been found that the temperature of drying affects the molecular weight distribution and melt index of the polymer produced. The preferred drying temperature is 100° C. to 300° C.

Activation of the supported catalyst can be accomplished at nearly any temperature up to about its sintering temperature. The passage of a stream of dry air or oxygen through the supported catalyst during the activation aids in the displacement of the water from the support. Activation temperatures of from about 300° C. to about 900° C. for a period of about six hours or so should be sufficient if well dried air or oxygen is used, and the temperature is not permitted to get so high as to cause sintering of the support.

Any grade of support can be used but microspheroidal intermediate density silica having a surface area of 300 square meters per gram, a port diameter of about 200 Å, and an average particle size of about 70 microns is preferred (e.g., Grade 952 MS 1D silica available from Davison Chemical Division, W. R. Grace and Company).

A fluidized bed reaction system which can be used to polymerize alpha-olefins is illustrated in the drawing. With references thereto the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, mass gas flow through the bed must be above the minimum flow required for fluidization, preferably from about 1.5 to about 10 times $G_{mf}$, and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the particulate catalyst throughout the reaction zone. On start-up, the reaction system is purged under pressure by means of an inert gas to remove catalytic poisons, such as oxygen and moisture, which may be present in the system. The gas may be introduced into the system at point 18. The reactor is then charged with a base of particulate polymer particles. Such particles may be identical in nature to the polymer to be formed or different therefrom. When different, they are withdrawn with the desired formed polymer particles as the first product. Eventually, a fluidized bed of the desired particles supplants the start-up bed.

After a second purge with an inert gas to remove catalytic poisons, the temperature and pressure in the reactor are adjusted to the temperature and pressure to be employed during polymerization, and a solution of the dialkylzinc compound is introduced into the reaction system from dispenser 17 through line 27a which flows into the gas recycle line of such system. The dialkylzinc compound is stored in the dispenser under an inert gas blanket.

After a suitable time has elapsed following injection of the solution of the dialkylzinc compound into the reaction system, the supported chromium oxide catalyst is introduced into the reactor at point 30 from a reservoir 32 where it is stored under an inert gas blanket. An inert gas can be used to carry the catalyst into the reactor. Often polymerization will begin within one hour after the supported chromium oxide catalyst is introduced into the reactor.

Fluidization is achieved by a high rate of gas recycle to and through the bed, typically on the order of about 50 times the rate of feed of make-up gas. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus it has been observed that the bed acts to almost immediately adjust the temperature of the recycle gas above this lower layer to make it conform to the temperature of the bed, thereby maintaining itself at an essentially constant temperature under steady state conditions. The recycle is then returned to the reactor at its base 18 and to the fluidized bed through distribution plate 20. The compressor 25 can also be placed downstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization throughout the bed is, therefore, important. The distribution plate 20 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recycle gas through the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention in amounts varying between about 0.001 to about 10 moles of hydrogen per mole of ethylene in the gas stream.

Also, if desired, any gas inert to the catalyst and reactants can also be present in the gas stream.

It is essential to operate the fluid bed reactor at a temperature below the sintering temperature of the polymer particles to insure that sintering will not occur. Generally, an operating temperature of about 75° C. to 115° C. is preferred, and a temperature of about 80° C. to 110° C. is most preferred.

The fluid bed reactor is operated at pressures of up to about 1000 psi, and is preferably operated at a pressure of from about 50 psi to 350 psi, with operation at the higher pressures in such ranges favoring heat transfer since an increase in pressure increases the unit volume heat capacity of the gas.

The catalyst is injected into the bed at a rate equal to its consumption at a point 30 which is above the distribution plate 20. An inert gas can be used to carry the catalyst into the bed. Preferably, the catalyst is injected at a point in the bed where good mixing of polymer particles occurs. Injection into the viable bed aids in distributing the catalyst throughout the bed and tends to preclude the formation of localized spots of high catalyst concentration which may result in the formation of "hot spots".

The production rate of the reactor is controlled by the rate of catalyst injection. The production rate may be increased by simple increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continually withdrawn at a point 34 at or close to the distribution plate 20 and in suspension with a portion of the gas stream which is vented before the particles settle to minimize further polymerization and sintering when the particles reach their ultimate collection zone.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to wait the next product recovery operation.

Finally, the fluidized bed reactor is equipped with an adequate venting system to allow venting the bed during start-up and shut-down. The reactor does not require the use of stirring means and/or wall scraping means.

The feed stream of gaseous monomer(s) polymerizes at a space time yield of about 2 to 10 pounds/hour/cubic foot of bed volume.

The following Examples are designed to illustrate the process of the present invention and are not intended as a limitation upon the scope thereof.

The properties of the polymers produced in the Examples were determined by the following test methods:

Density
 ASTM-1505 procedure is followed for polymers having a density of less than 0.940 g/cm$^3$, and a modified procedure is used for polymers having a density of 0.940 g/cm$^3$ or more. For the low density polymers, a plaque is made and conditioned for one hour at 100° C. to approach equilibrium crystallinity. For the high density polymers, the plaque is conditioned for one hour at 120° C. to approach equilibrium crystallinity, and is then quickly cooled to room temperature. Measurement for density is then made in a density gradient column and density values are reported as grams/cm$^3$.

Melt Index (MI)
 ASTM D-1238-Condition E-Measured at 190° C.-reported as grams per 10 minutes.

Flow Index (HLMI)
 ASTM D-1238-Condition F-Measured at 10 times the weight used in the melt index test above.

Melt Flow Ratio (MFR)=(Flow Index/Melt Index)

Bulk Density
 ASTM D-1895-Method B. The resin is poured via ⅜" diameter funnel into a 400 ml graduated cylinder to 400 ml line without shaking the cylinder, and weighed by difference.

Average Particle Size
 This is calculated from sieve analysis data measured according to ASTM D-1921, Method A, using a 500 g sample. Calculations are based on weight fractions retained on the screens.

Ash
 A sample of the bed is ashed, and the weight percent of ash is determined.

EXAMPLE 1

CATALYST PREPARATION

One hundred grams (100 g) of a commercial silica impregnated with chromic acetate to a concentration of 1 weight percent chromium (Grade 969 MSB silica obtained from Davison Chemical Division, W. R. Grace and Company) was admixed with 400 grams of a commercial unimpregnated silica (Grade 952 MS 1D silica obtained from Davison Chemical Division, W. R. Grace and Company). The silica mixture was then dried by heating under a stream of nitrogen for about four hours at 200° C.

About 400 grams of the dried silica mixture was slurried in about 2000 ml of dry isopentane, and 140 grams of titanium tetraisopropoxide was added to the slurry. The system was thoroughly mixed and then heated to remove the isopentane.

The dried product was then transferred to an activator (heating vessel) and admixed with 4 grams of $(NH_4)_2SiF_6$. The mixture was then heated under nitrogen at a temperature of 150° C. for one hour, and then at 300° C. for an additional hour, to insure that all the isopentane was removed and to slowly remove organic residues from the titanium tetraisopropoxide so as to avoid any danger of a fire. The nitrogen stream was then replaced with a stream of dry air and the mixture was heated at 300° C. for about two hours and then at 825° C. for about eight hours to produce an activated catalyst composition. The activated catalyst was then cooled with dry air (at ambient temperature) to about 150° C., and then to room temperature with nitrogen (at ambient temperature).

After activation, the catalyst contined 0.20 percent by weight chromium, 3.74 percent by weight titanium, and 0.15 percent by weight fluorine.

EXAMPLE 2

COPOLYMERIZATION OF ETHYLENE

Ethylene was copolymerized with butene-1 in a series of 5 experiments employing the catalyst prepared in accordance with Example 1. In all but one of the experiments, polymerization was initiated with the aid of a diethylzinc solution.

The reaction system employed was as illustrated in the drawing and described above. It had a lower section 10 feet high and 13½ inches in (inner) diameter, and an upper section 16 feet high and 23½ inches in (inner) diameter.

The reaction system was first purged with nitrogen gas pressurized to 50 psi. and maintained at a temperature of 70° C. Purging was continued until the reaction system contained 5 ppm moisture.

When purging was complete, particulate particles of a low density polyethylene-butene-1 copolymer resin were introduced into the reactor to a height of 4 feet, and the reaction system was again purged with nitrogen until it contained 1–5 ppm moisture. The nitrogen gas was introduced into the reactor under a pressure of 50 psi. and at a temperature of 85° C.

The reaction system was then pressurized to 300 psig with ethylene gas and the temperature adjusted to 88° C. Following this, 400–500 ml. of a 5 percent by weight solution of diethylzinc in isopentane were introduced into the reactor and mixed through the reaction system by circulating the ethylene gas through the reaction system for 1–2 hours. At the end of this time, the reaction system was vented to reduce the pressure to 80 psig, and then repressurized to 300 psig with ethylene, butene-1, and hydrogen, in order to reduce the nitrogen content of the reaction system and establish reaction conditions. The pressure was otherwise maintained at 300 psig throughout this period, and the temperature at 88° C.

The catalyst prepared as described in Example 1 was then introduced into the reactor at a rate of 3 grams per hour while the temperature was maintained at 88° C. and the pressure at 300 psig. If polymerization did not begin within one hour after the catalyst feed had begun, the feed was continued while additional diethylzinc solution was introduced into the reactor at a rate of 90-160 ml./hour.

When polymerization began, the catalyst feed rate was adjusted as necessary to control the polymerization rate, and ethylene, butene-1 and hydrogen were introduced into the reactor at a rate sufficient to maintain a butene-1/ethylene molar ratio of from 0.078 to 0.080 and a hydrogen/ethylene molar ratio of 0.02. The temperature was maintained at 88° C. and the pressure at 300 psig throughout the polymerization. The gas velocity employed was 3 to 6 times $G_{mf}$, and the space time yield was 4.8 to 6.5 pounds/hour/cubic foot.

When diethylzinc was employed as a start-up aid, polymerization began in a smooth and controllable manner within 0.5–4 hours after the catalyst was introduced into the reactor and proceeded to a normal level without hot-spotting or fouling. Desired polymer properties were attained within three bed turnovers following start-up.

However, when no diethylzinc was employed as a start-up aid, polymerization did not begin after 16 hours despite the fact that catalyst was introduced into the reaction system in an amount sufficient to provide 0.85 weight percent ash. Such ash content is about 8.5 times the amount of catalyst necessary to carry out reaction at the normal rate (normally 0.01 weight percent ash).

Table I below lists the concentration of moisture in the recycle gas following the second nitrogen purge, the concentration of the diethylzinc solution employed as start-up aid in each experiment, the amount of such solution initially added to the reactor, the total amount of such solution added to the reactor, the total ash added to the reactor (diethylzinc and catalyst) before polymerization began, and the time required to initiate polymerization after the catalyst was first introduced into the reactor. Table I also indicates whether hot-spotting or polymer sheeting occurred in the reactor during start-up.

Table II below lists the various properties of the polymer bed both prior to and following completion of polymerization.

TABLE II-continued

| | Start-up No. | | | | |
|---|---|---|---|---|---|
| | 1 | 2 | 3 | 4 | 5 |
| Bed Properties (After Polymerization) | | | | | |
| Sample taken after n hours | No reaction | 8 | 52 | 105 | 107 |
| Melt Index, dg/min. | — | 0.52 | 0.52 | 0.63 | 1.1 |
| Flow Index, dg/min. | — | 47 | 40 | 60 | 84 |
| Melt Flow Ratio | — | 91 | 78 | 95 | 76 |
| Density, g/cc. | — | 0.922 | 0.922 | 0.925 | 0.928 |
| Average Particle Size, in. | — | 0.042 | 0.038 | 0.039 | 0.023 |
| % Resin through 200 Mesh Screen | — | 0.6 | 0.6 | 0.8 | 0.8 |
| Bulk Density, lbs/ft³ | — | 27.2 | 24.8 | 24.9 | 24.2 |

What is claimed is:

1. A method for initiating homopolymerization of ethylene, or copolymerization of ethylene with at least one other alpha-olefin containing from 3 to 8 carbon atoms, in a fluidized bed reactor employing a supported chromium oxide catalyst which comprises (1) adding a dialkylzinc compound to the fluidized bed reactor prior to the commencement of polymerization and subjecting the reactor containing such dialkylzinc compound to a pressure of from 50 psi to 350 psi and a temperature of from 75° C. to 115° C. for at least 5 minutes, said dialkylzinc compound having the formula $$ZnR_aR_b$$

wherein $R_a$ and $R_b$ are alkyl radicals containing from 1 to 12 carbon atoms, and said dialkylzinc compound being added to said fluidized bed reactor in an amount sufficient to provide from 1 mol to 5,000 mols of zinc per mol of chromium required to maintain a catalytically effective amount of such catalyst in the reactor during polymerization, and then (2) introducing a supported chromium oxide catalyst into the fluidized bed reactor at a rate of from 25 percent to 100 percent of the rate employed during polymerization to maintain a catalytically effective amount of such catalyst in the reactor, and maintaining said temperature and pressure until polymerization begins.

2. A method as in claim 1 wherein the fluidized bed reactor is purged with an inert gas to a moisture content no greater than 5 ppm before the dialkylzinc compound is added to the reactor.

3. A method as in claim 2 wherein the fluidized bed reactor is subjected to a pressure of from 50 psi to 350 psi and a temperature of from 75° C. to 115° C. for at least 1 hour before the supported chromium oxide catalyst is introduced into the reactor.

4. A method as in claim 1, 2 or 3 wherein $R_a$ and $R_b$ are alkyl radicals containing from 1 to 6 carbon atoms.

TABLE I

| Start-up No. | Moisture Content of Recycle Gas | Polymerization Start-up Aid | Conc. of Diethylzinc Solution | Initial Amount of Diethylzinc Solution | Total Amount of Diethylzinc Solution | Ash Required to Initiate Polymerization | Time Required to Initiate Polymerization | Hot-Spotting | Sheeting |
|---|---|---|---|---|---|---|---|---|---|
| 1 | 1 ppm | None | — | — | — | 0.085 | No Reaction After 16 Hours | | |
| 2 | 1 ppm | Diethylzinc | 5 wt % | 400 ml. | 560 ml. | 0.008 | 1.2 Hrs. | No | No |
| 3 | 1 ppm | Diethylzinc | 5 wt % | 400 ml. | 575 ml. | 0.014 | 2 Hrs. | No | No |
| 4 | 5 ppm | Diethylzinc | 5 wt % | 400 ml. | 964 ml. | 0.024 | 3.6 Hrs. | No | No |
| 5 | 1 ppm | Diethylzinc | 5 wt % | ~500 ml. | ~500 ml. | ~0.003 | 0.5 Hrs. | No | No |

TABLE II

| | Start-up No. | | | | |
|---|---|---|---|---|---|
| | 1 | 2 | 3 | 4 | 5 |
| Bed Properties (Prior to Polymerization) | | | | | |
| Melt Index, dg/min. | 0.40 | 0.47 | 0.34 | — | — |
| Flow Index, dg/min. | 39 | — | 35 | — | — |
| Melt Flow Ratio | 97 | — | 103 | — | — |
| Density, g/cc. | 0.921 | 0.921 | — | — | — |
| Average Particle Size, in. | 0.037 | 0.053 | 0.054 | — | — |
| % Resin through 200 Mesh Screen | 0 | 0 | 0 | — | — |
| Bulk Density, lbs/ft³ | 25.5 | 25.8 | 25.8 | — | — |

5. A method as in claim 4 wherein the dialkylzinc compound is diethylzinc.

6. A method as in claim 1, 2 or 3 wherein the fluidized bed reactor is pressurized to a pressure of from 50 psi to 350 psi with ethylene.

7. A method as in claim 6 wherein $R_a$ and $R_b$ are alkyl radicals containing from 1 to 6 carbon atoms.

8. A method as in claim 7 wherein the dialkylzinc compound is diethylzinc.

9. A method as in claim 1, 2 or 3 wherein further dialkylzinc compound is introduced into the fluidized bed reactor subsequent to the introduction of the supported chromium oxide catalyst into the reactor in an amount sufficient to provide from 1 to 3,000 mols of zinc per mol of chromium being introduced into the reactor.

10. A method as in claim 9 wherein $R_a$ and $R_b$ are alkyl radicals containing from 1 to 6 carbon atoms.

11. A method as in claim 10 wherein the dialkylzinc compound is diethylzinc.

12. A method as in claim 9 wherein the fluidized bed reactor is pressurized to a pressure of from 50 psi to 350 psi with ethylene.

13. A method as in claim 12 wherein $R_a$ and $R_b$ are alkyl radicals containing from 1 to 6 carbon atoms.

14. A method as in claim 13 wherein the dialkylzinc compound is diethylzinc.

15. A method as in claim 1 wheren the dialkylzinc compound is added to the fluidized bed reactor in an amount sufficient to provide from 500 mols to 3,500 mols of zinc per mol of chromium required to maintain a catalytically effective amount of the catalyst in the reactor during polymerization, and the supported chromium oxide catalyst is introduced into the fluidized bed reactor at a rate of from 30 percent to 100 percent of the rate employed during polymerization to maintain a catalytically effective amount of such catalyst in the reactor.

16. A method as in claim 15 wherein the fluidized bed reactor is purged with an inert gas to a moisture content no greater than 3 ppm before the dialkylzinc compound is added to the reactor.

17. A method as in claim 16 wherein the fluidized bed reactor is subjected to a pressure of from 50 psi to 350 psi and a temperature of from 75° C. to 115° C. for at least 1 hour before the supported chromium oxide catalyst is introduced into the reactor.

18. A method as in claim 15, 16 or 17 wherein $R_a$ and $R_b$ are alkyl radicals containing from 1 to 6 carbon atoms.

19. A method as in claim 18 wherein the dialkylzinc compound is diethylzinc.

20. A method as in claim 15, 16 or 17 wherein the fluidized bed reactor is pressurized to a pressure of from 50 psi to 350 psi with ethylene.

21. A method as in claim 20 wherein $R_a$ and $R_b$ are alkyl radicals containing from 1 to 6 carbon atoms.

22. A method as in claim 21 wherein the dialkylzinc compound is diethylzinc.

23. A method as in claim 15, 16 or 17 wherein further dialkylzinc compound is introduced into the fluidized bed reactor subsequent to the introduction of the supported chromium oxide catalyst into the reactor in an amount sufficient to provide from 100 mols to 900 mols of zinc per mol of chromium being introduced into the reactor.

24. A method as in claim 23 wherein $R_a$ and $R_b$ are alkyl radicals containing from 1 to 6 carbon atoms.

25. A method as in claim 24 wherein the dialkylzinc compound is diethylzinc.

26. A method as in claim 23 wherein the fluidized bed reactor is pressurized to a pressure of from 50 psi to 350 psi with ethylene.

27. A method as in claim 26 wherein $R_a$ and $R_b$ are alkyl radicals containing from 1 to 6 carbon atoms.

28. A method as in claim 27 wherein the dialkylzinc compound is diethylzinc.

* * * * *

UNITED STATES PATENT AND TRADEMARK OFFICE
CERTIFICATE OF CORRECTION

PATENT NO. : 4,376,191
DATED : March 8, 1983
INVENTOR(S) : Reginald W. Geck

It is certified that error appears in the above-identified patent and that said Letters Patent are hereby corrected as shown below:

Column 1, line 18, "maintainance" should read -- maintenance --.

Column 4, line 53, "compund" should read -- compound --.

Column 6, line 16, "port" should read -- pore --.

Column 6, line 18, "1D" should read -- ID --.

Column 6, line 61, "17" should read -- 27 --.

Column 9, line 66, "1D" should read -- ID --.

Column 10, line 23, "contined" should read -- contained --.

Column 11, line 25, "0.85" should read -- 0.085 --.

Signed and Sealed this

Eighteenth Day of October 1983

[SEAL]

Attest:

GERALD J. MOSSINGHOFF

Attesting Officer — Commissioner of Patents and Trademarks